United States Patent [19]
Shelbourne et al.

[11] Patent Number: 5,438,818
[45] Date of Patent: Aug. 8, 1995

[54] STRIPPER DRUMS

[75] Inventors: Keith Shelbourne; Paul J. McCredie, both of Suffolk, England

[73] Assignee: Shelbourne Reynolds Engineering Ltd., Suffolk, England

[21] Appl. No.: 256,565

[22] PCT Filed: Jan. 12, 1993

[86] PCT No.: PCT/GB93/00056

§ 371 Date: Jul. 14, 1994

§ 102(e) Date: Jul. 14, 1994

[87] PCT Pub. No.: WO93/03642

PCT Pub. Date: Jul. 22, 1993

[30] Foreign Application Priority Data

Jan. 14, 1992 [GB] United Kingdom ............... 9200726

[51] Int. Cl.⁶ .................. A01D 41/06; A01D 75/18
[52] U.S. Cl. ................................ 56/220; 56/130; 56/364
[58] Field of Search ............... 56/126, 130, 220, 364

[56] References Cited

U.S. PATENT DOCUMENTS 2,910,819 11/1959 Helliwell .......................... 56/220
4,587,799 5/1986 Thomas et al. .................. 56/14.6

FOREIGN PATENT DOCUMENTS 2750501 5/1979 Germany .
376049 5/1973 U.S.S.R. ........................... 56/220
898994 1/1982 U.S.S.R. ........................... 56/220
8601972 4/1986 WIPO .
9208339 5/1992 WIPO .

Primary Examiner—David J. Bagnell
Attorney, Agent, or Firm—Dennis T. Griggs

[57] ABSTRACT

A crop stripper has at least one drum (6a, 6b) with several axially extending series of stripping teeth (8). The drum is rotatably in end supports. The tooth roots (26) at the ends of the drum have an edge profile inclined radially away from the adjacent supports to deflect plant stems which contact these profiles during the operation of the stripper away from the supports, so reducing the tendency for the stems to become trapped between rotor and support. A capping (32) on the support overlaps the adjacent tooth roots to assist this effect. A pair of drums can be arranged end to end with an intermediate support (14) between them and be similarly arranged to deflect plant stems away from the intermediate support. This allows increase of the operating width of the crop stripper while minimizing the risk of blockage from stems trapped between the intermediate support and the drums.

10 Claims, 2 Drawing Sheets

STRIPPER DRUMS

This invention relates to crop strippers for detaching and harvesting standing crops, such grain or flowers or herbage.

Typically such strippers comprise a rotary carrier in the form of a drum which carries axially extending series of teeth which, as the stripper is advanced through the crop, strip desired parts such as grain, leaves or blossom from stems of the crop.

Crop strippers are made in a range of sizes and in one of its aspects the present invention is concerned particularly with multiple drum strippers in which a rotor is divided into at least two carriers or drums arranged coaxially side by side, e.g. in order to increase the overall width of the rotor, and a bearing support separates the adjacent ends of the drums.

When such multiple drum rotors are operated there is a tendency for the plant stems to be caught between two adjacent drums. The bearing support takes the form of a plate fixed to a casing of the stripper, so it is not possible to avoid gaps or clearances in this region and plant stems can become wedged between the drums and the sides of the support, leading to a blockage and even seizure of the rotor. The present invention is concerned with measures which can at least alleviate this problem.

According to one aspect of the present invention, there is provided a crop stripper comprising a rotary carrier having an axially extending series of stripping teeth, supports for the carrier at the ends of the carrier, said support at least at One end of the carrier being flanked by root portions of the stripping teeth most adjacent the support and, comprising a radially outer element which projects radially outwardly of the nearest ends of said flanking tooth root portions, in the region nearer said support the edge profile of said root portions being inclined radially inwardly away from the support whereby crop stems contacting said root portion profiles are deflected away from the support.

More particularly the crop stripper has a rotor, whether with one or more carriers, mounted in side supports at its opposite ends, each said support being flanked by root portions of the stripping teeth most adjacent said support and comprising a radially outer element which projects radially outwardly of the nearest ends of said flanking tooth root portions, in the region nearer said support the edge profile of said root portions being inclined radially inwardly away from the support whereby crop stems contacting said root portion profiles are deflected away from the support.

According to another aspect of the invention, in a crop stripper comprising a rotor having at least two rotary carriers arranged coaxially side by side, said carriers having axially extending series of stripping teeth projecting from them, a support for the rotor extends between said two carriers and is flanked by root portions of the stripping teeth most adjacent each side of the support, said support comprising an element projecting radially outwardly of the nearest ends of said flanking tooth root portions, in the region nearer said support the edge profile of said root portions being inclined radially inwardly away from the support whereby crop stems contacting said root portion profiles are deflected away from the support.

In such a multiple-carrier arrangement said formation of the end root portion profiles can be practised at the ends of each carrier, whether adjacent an intermediate or an end support.

Preferably, said radially outer element of the or each support comprises an outer portion extending axially towards the or each carrier to overlap said adjoining ends of the tooth root portions.

The axial overlap of such a radially outer element can prevent the direct entry of plant stems to the clearances between the support and the carriers. The axial overlap of an element and the inclination of the adjoining tooth root edge profiles can therefore act in a complementary way against the tendency of plant stems to become trapped between the plate and the carriers.

Preferably said support outer element has a radially outer surface which is inclined radially inwardly towards the root portions of the adjacent teeth. Thus, if the support is disposed between two carriers, the outer surface may be given a substantially V-form radial cross-section to incline towards the root portions on both sides. In this way it is possible to minimise any risk that plant stems will become lodged upon that radial outer surface, which in extreme circumstances could lead to a build-up that could affect the operation of the stripper adversely.

For efficient stripping it is known to give the root portions of the teeth of a crop stripper re-entrant edges to form bulbous gaps between the roots of adjacent teeth. In a crop stripper according to the present invention it is preferred to arrange that said support outer element lies within the radial extent of such bulbous profiles at the roots of the associated end teeth.

A further measure which can be adopted to assist keeping the spaces at the end teeth free from blockage is to arrange that the end teeth are offset towards the support with the tip of each said end tooth at a pitch from the neighbouring tooth of the associated row of teeth that is increased relative to the pitch of intermediate teeth of said row. This limits the amount of crop that is received between the or each set of end teeth and their adjacent support so making it easier to discard any plant stems that have been caught up in this region.

In the foregoing references to the teeth adjacent the support or supports, it will be understood that each end tooth can be made as a single member or can be composed of two or more members which jointly have the features described, as in 8 stripper drum such as is described in WO92/08339.

The invention will now be described by way of example with reference to the accompanying drawings, in which.

Figure 1:
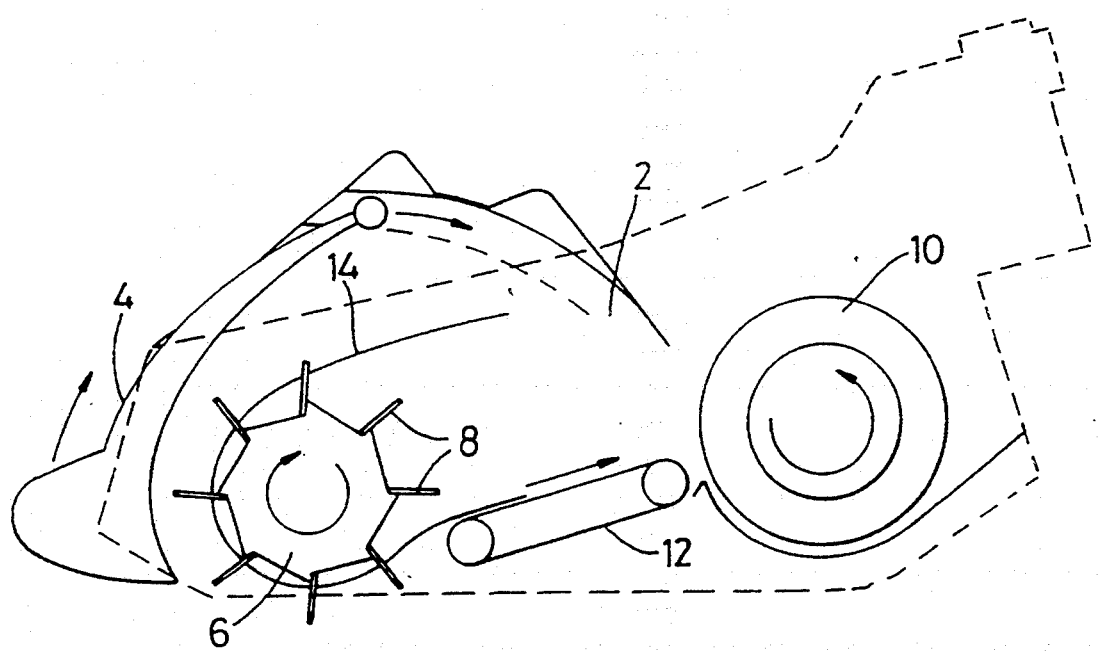
FIG. 1 is a schematic side view of a known form of crop stripper.

FIG. 1 illustrates main components of a known form of crop stripper for attachment to a combine (not shown) or other crop collecting vehicle. The stripper comprises an outer casing 2, open to the ground, with an adjustable top cover 4. Within the casing is a stripping rotor 6 comprising axial rows of stripping teeth 8 journalled at its ends in the casing. Crop stripped by the rotor is delivered to an auger 10 by way of a transfer conveyor 12, and from the auger the crop goes to a collection space (not shown) in the collecting vehicle.

Figure 2:
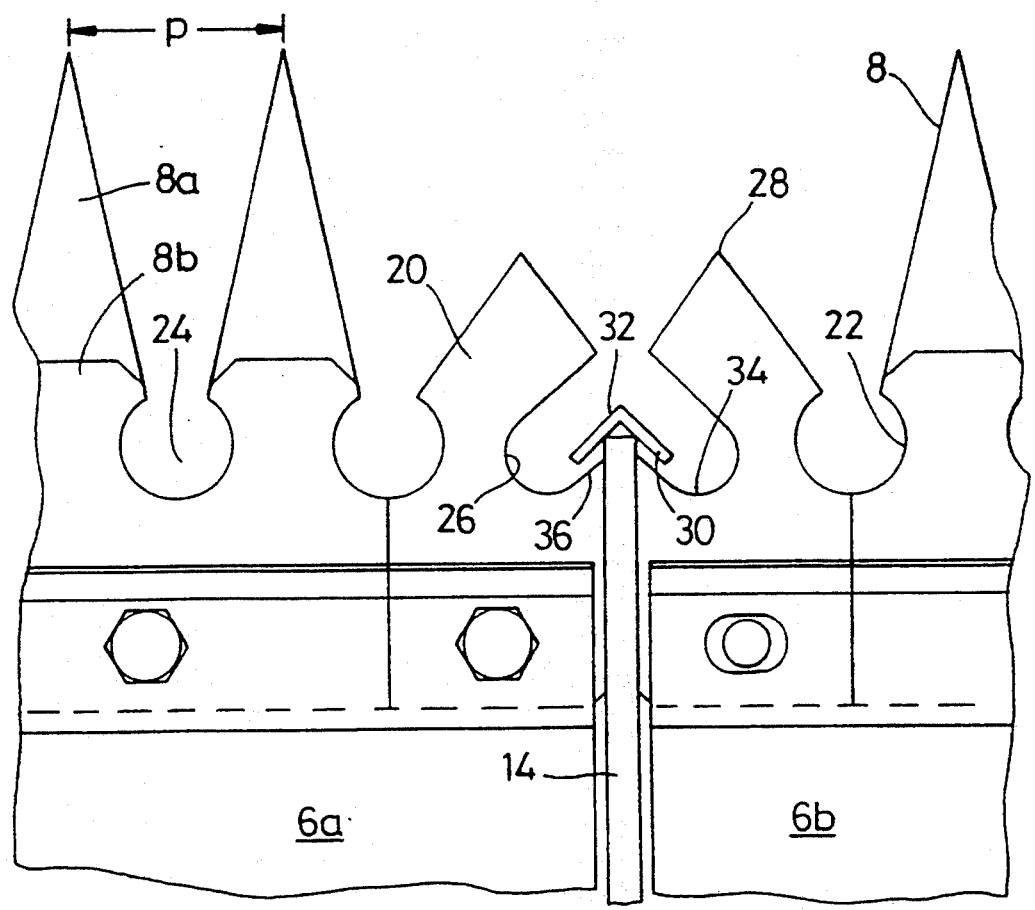
FIG. 2 is a fragmentary and diagrammatic plan view of a portion of a crop stripper according to the invention showing the forward portion of a twin-drum rotor in the region of the adjacent ends of the two drums.

Because in this example the stripping rotor has a relatively large axial length, it is necessary to provide it with intermediate support from the casing, typically in the form of a plate 14 which lies intermediate the rotor axial length as a static bearing support. The rotor is therefore divided into two coaxial drums of chosen lengths, e.g. each being some 3 meters long. FIG. 2 illustrates a detail of the support plate 14 and the drums 6a, 6b on each side of it.

Over the main extent of each drum 6a there are uniform axial rows of the teeth 8. The tooth pitch is generally constant but adjacent the support plate 14 each row of teeth has a modified end tooth 20. In the example illustrated each end tooth occupies a width equal to the pitch p of the main series of teeth. The teeth 8 have reentrant side edges 22 in their root portions to form bulbous gaps 24 between them. The mutually adjacent end teeth 20 of the two drums are canted towards each other so that at their closest approach their similarly re-entrant side edges 26 form an entry opening to their combined root gap with an opening width substantially the same as or even less than the minimum opening width to the root gaps in the main series of teeth. The outer tips 28 of the end teeth are also offset towards each other to lie at an axial spacing no greater, and preferably smaller, than the axial spacing between each of them and its adjacent tooth of the main series of teeth 8.

The support plate 14 itself has a capping 30 over its edge radially outwardly of the drum. The capping has a V-section outer surface 32, the sides of that section sloping radially inwardly towards the adjacent teeth 8. The width of the capping is greater than the minimum opening width between the two end teeth. The form of the combined bulbous root gap immediately adjacent the plate 14 and capping 30 is also modified from the form of the root gaps 24 of the main teeth. Radially innermost zone 34 of the tooth root gap on each side of the support plate 14 is offset some distance from the plate. From the zone 34 towards the plate the profile of the gap is formed by a portion 36 which slopes radially inwards away from the plate 14 between which plate and the end face of the drum 6a or 6b there is a free running clearance.

The canting of the tips of the end teeth towards each other limits the swath of crop taken into the space gap between the end teeth, so reducing the load on this critical region. Moreover, by setting the minimum opening width between the teeth to less than the width of the capping it is generally ensured that the crop stems coming between the teeth will first strike the sloping side of the capping end be deflected by it laterally away from the support plate opening and the ends of the drums. Most importantly, the inwards inclination of the edges of the root gaps from their ends adjoining the support plate reduces any tendency of stems held in the root gaps to work into the clearances between the ends of the drums and the plate. All these features therefore combine to reduce any risk of crop becoming trapped between the plate and the drums and causing blockages there.

The end teeth can be formed as separate elements, as indicated in FIG. 2, or can be end portions of longer comb plates formed with some or all of the main series of teeth. They can have the same radial extent as the main series of teeth, although this is not shown in FIG. 2.

Each end tooth can be formed as a unitary member, as shown in FIG. 2, or it can be compounded from a plurality of elements lying over each other, as in the case of the two-element construction of the main series of teeth 8 in FIG. 2 with their full radial height guide tooth elements 8a fronted by shorter stripping projections 8b. Further description of such a compounded double-element arrangement of teeth is given in our application WO92/08339. The tip spacing of the guide elements of the end teeth will then determine the swath width that is taken into the root gap between the stripping projections on opposite sides of the support plates.

Figure 3:
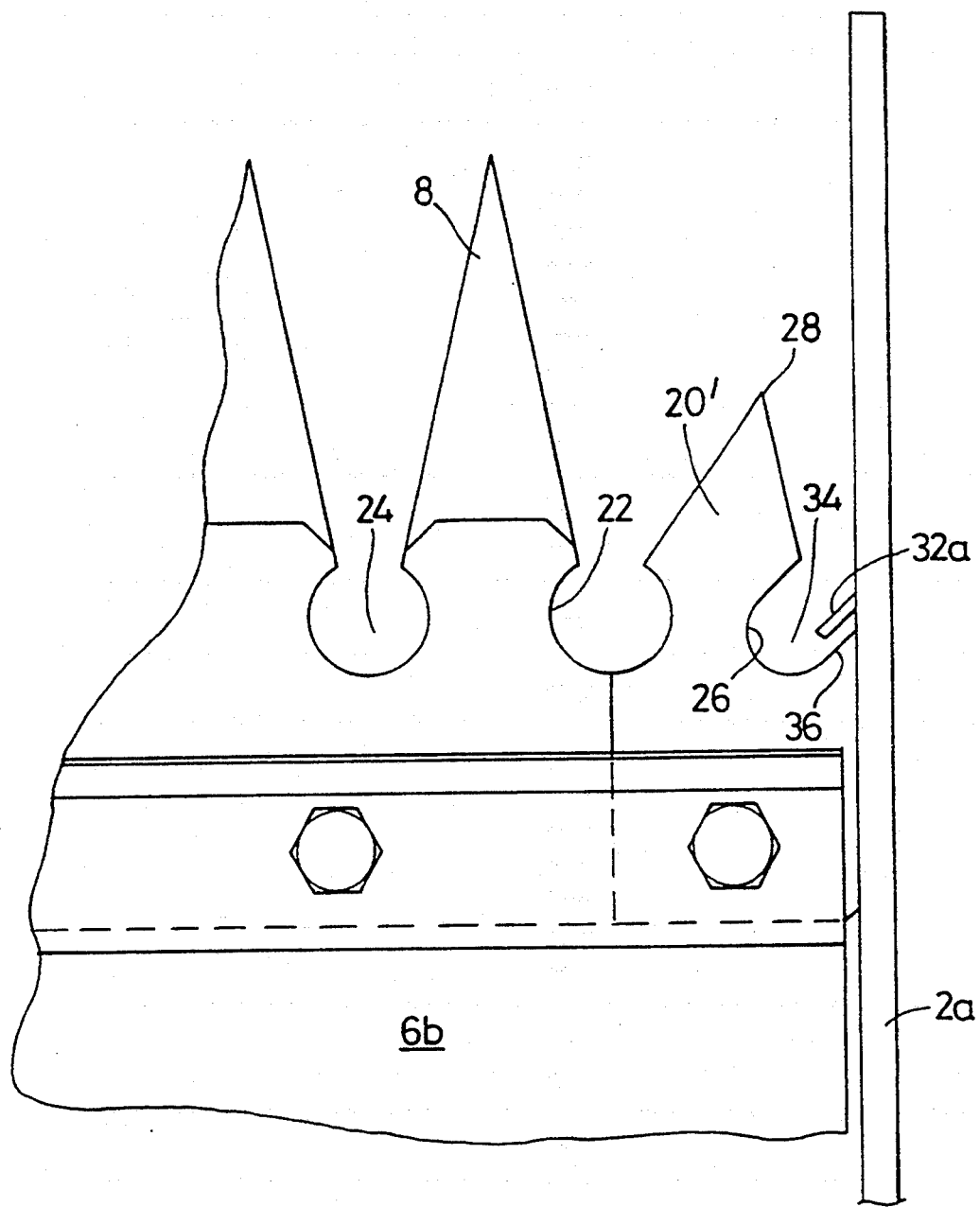
FIG. 3 is a similar fragmentary view showing another embodiment of the invention.

FIG. 3 illustrates how similar measures to those described with reference to FIG. 2 can be provided at the outer side supports for the opposite ends of the rotor drums to provide similar protection there against blockage. Parts already described are indicated by the same reference numbers.

The rotor drum 6b is indicated in FIG. 3, but of course the opposite end of the rotor 6a can be provided with precisely the same arrangement in mirror image. The modified end tooth 20' now forms with the facing side wall 2a of the casing a restricted entry to the bulbous gap provided by the re-entrant side edge 26. Protective rib 32a disposed radially outwardly of the drum 6b corresponds to one half of the capping 30 and is disposed in the same spatial relationship to gap profile portion 36 of the associated gap inner zone 34 as the capping 30 to its root portion gap. The rotor is of course mounted with a free running clearance from the side wall 2b. That side wall extends beyond the rib 32a because it forms part of the casing for the entire stripper mechanism.

The preferred form of tooth 20' shown in FIG. 3 differs from the teeth 20 of FIG. 2 in two main respects. Its outer lateral apex is at a smaller offset than the corresponding point on a tooth 20 so as not to narrow unduly the restricted gap between the tooth and the side wall 2b. If this gap is made too small there is a risk it will be blocked by the stems that enter between the tooth and the side wall. The size of the gap is similar to that between the teeth 20. Also, the outer apex of the tooth 20' is canted further outwards than is the apex of a tooth 20, so that more crop is diverted away from the side wall 2b than is the case with the support plate 14.

It will be understood that the arrangement shown in FIG. 3 can equally be employed at one or both ends of a single drum stripper mechanism as with the double drum mechanism of FIG. 2.

We claim:

1. A crop stripper comprising a rotary carrier having an axially extending series of stripping teeth, supports for the carrier at the ends of the carrier, said support at least at one end of the carrier being flanked by root portions of the stripping teeth most adjacent the support and comprising a radially outer element which projects radially outwardly of the nearest ends of said flanking tooth root portions, in the region nearer said support the edge profile of said root portions being inclined radially inwardly away from the support whereby crop stems contacting said root portion profiles are deflected away from the support.

2. A crop stripper comprising a rotor having at least two rotary carriers arranged coaxially side by side, said carriers having axially extending series of stripping teeth projecting from them, a support for the rotor extending between said two carriers, said support being flanked by root portions of the stripping teeth most adjacent each side of the support, said support comprising an element projecting radially outwardly of the nearest ends of said flanking tooth root portions, in the region nearer said support the edge profile of said root portions being inclined radially inwardly away from the support whereby crop stems contacting said root portion profiles are deflected away from the support.

3. A crop stripper according to claim 2 wherein said projecting element is provided with an outer surface having a substantially V-form radial cross-section which is inclined towards the teeth of the respective carriers on opposite sides of the or each element.

4. A crop stripper according to claim 2 wherein there are further supports at both ends of each carrier and said supports are both provided with radially outer elements which extend axially to overlap their respective adjoining tooth root portions at each end of the carrier or carriers.

5. A crop stripper comprising a rotary carrier having axially extending series of stripping teeth and mounted in side supports at its opposite ends, each said support being flanked by root portions of the stripping teeth most adjacent said support and comprising a radially outer element which projects radially outwardly of the nearest ends of said flanking tooth root portions, in the region nearer said support the edge profile of said root portions being inclined radially inwardly away from the support whereby crop stems contacting said root portion profiles are deflected away from the support.

6. A crop stripper according to any one of the preceding claims 1, 2 or 5 wherein the or each said outer element extends axially towards said carrier to overlap said nearest ends of the tooth root portions.

7. A crop stripper according to any one of claims 1, 2 or 5 wherein the or each said element has a radially outer surface which is inclined radially inwardly towards the adjacent stripper teeth.

8. A crop stripper according to any one of claims 1, 2 or 5 wherein the root portions of the teeth have a re-entrant profile which forms bulbous gaps at the roots of the teeth and said support outer element lies within the radial extent of said re-entrant profile of the tooth root portions most adjacent the support.

9. A crop stripper according to any one of claims 1, 2 or 5 wherein said stripper teeth most adjacent the or each support are offset towards the support so that the tip of each said tooth is at a pitch from the tip of its neighboring tooth in the associated axial series of teeth that is increased relative to the pitch of the tips of intermediate teeth of said series.

10. A crop stripper according to claim 1 or claim 5 wherein said supports at the ends of the carrier are both provided with radially outer elements which extend axially to overlap their respective adjoining tooth root portions at each end of the carrier.

* * * * *